United States Patent [19]

Bash

[11] Patent Number: 4,462,263
[45] Date of Patent: Jul. 31, 1984

[54] APPARATUS FOR PROVIDING AN INDICATION OF FLUID FLOW THROUGH A FLUID METERING DEVICE

[75] Inventor: Ignatius F. Bash, Huntingdon Valley, Pa.

[73] Assignee: F. S. Brainard & Company, Burlington, N.J.

[21] Appl. No.: 339,294

[22] Filed: Jan. 15, 1982

[51] Int. Cl.³ .............................................. G01F 1/115
[52] U.S. Cl. ................................................. 73/861.77
[58] Field of Search ........................ 73/861.77, 861.78; 324/173, 174; 336/110

[56] References Cited

U.S. PATENT DOCUMENTS

| | | | |
|---|---|---|---|
| 3,002,384 | 10/1961 | MacDonald et al. | 73/861.78 |
| 3,177,711 | 4/1965 | Ham et al. | 73/861.78 |
| 3,434,047 | 3/1969 | Brickner | 324/253 |
| 3,534,602 | 10/1970 | Boyd | 73/861.78 |
| 3,535,625 | 10/1970 | Pratt . | |
| 3,636,767 | 1/1972 | Duffy . | |
| 3,707,686 | 12/1972 | Uekusa et al. | 324/173 X |
| 3,764,897 | 10/1973 | Greenwood . | |
| 3,780,579 | 12/1973 | Barnard . | |
| 3,783,248 | 1/1974 | Sugden, Jr. . | |
| 3,826,973 | 7/1974 | Pflaum . | |
| 4,059,744 | 11/1977 | Elderton . | |
| 4,121,112 | 10/1978 | Hartig . | |
| 4,138,642 | 2/1979 | Mohr . | |
| 4,339,713 | 7/1982 | Kago et al. | 324/173 |

Primary Examiner—S. Clement Swisher
Assistant Examiner—Brian R. Tumm
Attorney, Agent, or Firm—Richard C. Woodbridge

[57] ABSTRACT

A flow metering device includes a very sensitive sensor and detection unit for accurately measuring the flow of fluids such as water through a meter housing. At least two excitation windings are wound around a toroidal core of magnetic material having a non-linear characteristic. The excitation windings are connected in series to an AC source in such a way that the magnetic effects of the windings are additive. A pair of pickup windings are also wound around the core but in series-opposition fashion. The output of the pickup windings is fed to a detector unit including a negative feedback amplifier, rectifier diodes and a summing network. The apparatus is so sensitive that it can accurately detect the movement of an internal magnetic rotor through the rotor housing while rejecting other sources of possible interference.

4 Claims, 10 Drawing Figures

APPARATUS FOR PROVIDING AN INDICATION OF FLUID FLOW THROUGH A FLUID METERING DEVICE

TECHNICAL FIELD OF THE INVENTION

The present invention relates to fluid metering devices generally, and more particularly to sealed fluid metering devices in which an internal permanent magnet is provided to couple to a readout mechanism external to the fluid metering device. In this connection, it should be understood that the term "fluid" is utilized throughout this application in a general sense to comprehend both liquids and gases.

Such fluid metering devices incorporate, in general, an internal turbine or positive-displacement fluid motor which is coupled to the permanent magnet. Fluid flow, through the fluid metering device, causes the turbine or constant-displacement fluid motor to produce a rotation or nutation of the internal permanent magnet. The magnetic field of the magnet passes through the sealed case of the fluid metering device to drive another magnet, or, in some cases, a slug of magnetic material, which may, in turn, operate a conventional odometer-type mechanical counter.

There exists a requirement for providing a purely electronic readout of such fluid meter devices. For example, electronic readout permits the information regarding fluid flow to be encoded and processed digitally. Such information can also be transmitted to a central office via well-known telemetry techniques.

DESCRIPTION OF THE PRIOR ART

U.S. Pat. No. 3,780,579, DIGITAL INTEGRATING FLOWMETER, issued to R. K. Barnard on Dec. 25, 1973, discloses a typical prior-art technique for electromagnetic readout of a turbine-type flowmeter. This reference describes electromagnetic detection of the rotation of the permanent magnet rotor by means of the voltage directly induced in an electromagnetic pickup (14 in FIG. 1A). This arrangement is clearly distinguishable from the present invention, in that there is no ac excitation of a magnetic material. Unlike the present invention, the arrangement disclosed by Barnard produces a signal, at the electromagnetic pickup, having an amplitude that is directly proportional to flow rate.

U. S. Pat. No. 3,783,248, PARITY CHECK FOR TURBINE METER ELECTRONIC COUNTING INSTRUMENTATION OR THE LIKE, issued to H. Sugden, Jr., on Jan. 1, 1974, discloses another related technique. In this reference, the fluid metering device utilizes a vane of magnetic material (tab 20 in FIG. 1), rather than a permanent magnet, to couple a signal through the sealed fluid metering device. The technique disclosed in this reference basically senses magnetic reluctance by applying an external dc field to the fluid metering device. Again, there is no indication of the use of an ac current to modulate the magnetic intensity (H) in a core of magnetic material.

U.S. Pat. No. 4,138,642, METHOD AND ARRANGEMENT FOR INDIRECTLY ASCERTAINING THE ROTORY SPEED OF A PERMANENT-MAGNET-STATOR dc MOTOR, issued to A. Mohr on Feb. 6, 1979, discloses a similar technique for sensing the rotory motion of a motor. Like U.S. Pat. No. 3,780,579, this reference relies on the voltage induced in a pickup coil by a changing magnetic field. The sensor is responsive to time-rate-of-change of magnetic flux, rather than to magnetic flux directly. Coil 12, shown in FIG. 3, is the analog of the sensor means of the present invention.

U.S. Pat. No. 4,059,744, NET OIL COMPUTER OR THE LIKE, issued to P. P. Elderton on Nov. 22, 1977, discloses another fluid metering device in which an indication from a turbine-type flowmeter is coupled through the wall of a pipe to a simple pickup coil (405, in FIG. 1) mounted on the external surface. This arrangement, like the arrangements described in the preceding references, is distinguishable by the fact that the sensor does not provide for ac excitation of the magnetic intensity (H) within a magnetic material. The apparatus described in this reference thus appears to be responsive to time-rate-of-change of magnetic flux, and not to magnetic flux directly.

U.S. Pat. No. 4,121,112, PULSE GENERATOR, issued to G. F. Hartig on Oct. 17, 1978, is not directed to a fluid metering device. This reference, rather, is concerned with generation of pulses from a toothed element, such as a gear. The apparatus described appears to utilize the rotating toothed structure to vary the mutual inductance between an excitation coil and a pickup coil. While the arrangement described in this reference does incorporate ac excitation of the magnetic intensity (H) within a magnetic material, operation does not depend upon any permanent magnetic field in the sensed object, nor does the technique rely on nonlinearity of the magnetic material of the sensor.

U.S. Pat. Nos. 3,535,625 (STRAIN AND FLAW DETECTOR), 3,764,897 (ELECTROMAGNETIC THICKNESS GAUGING USING A TRANSMITTING COIL SHAPED TO PROVIDE A CONSTANT FIELD OVER A RANGE OF MEASURING DISTANCES), and 3,826,973 (ELECTROMAGNETIC GRADIOMETER), are all directed to variations of a basic reluctance-sensing arrangement. Each of these references makes use of a sensor which incorporates one or more windings on a core of magnetic material. However, in each case, the sensor is responsive, not to an external magnetic field (such as would be produced by the internal permanent magnet of a fluid metering device), but rather to reluctance, i.e., the presence or absence of a magnetic or conducting material in the magnetic circuit. The techniques described in these references do not appear to rely on any nonlinearity in the magnetic material of the sensor, nor do they appear capable of sensing permanent magnetic fields (as distinguished from magnetic materials, i.e., materials having a permeability substantially greater than that of free space).

U.S. Pat. Nos. 3,809,998 (CURRENT REGULATOR FOR PULSE EDDY CURRENT TESTER), 3,823,368 (CALIBRATION AND BALANCE SYSTEM IN PULSE EDDY CURRENT TESTING APPARATUS), and 4,112,365 (POSITION DETECTING SYSTEM), are cited for their disclosure of other, less closely related approaches for remotely sensing magnetic or conducting materials.

Neither individually nor in combination do these references disclose or suggest the unique sensor and detection means of the present invention. While they do disclose various arrangements for detecting the motion of a permanent magnet by a pickup coil, which responds to time-rate-change of magnetic flux, or remote sensing of a magnetic or conducting material by means of a reluctance bridge technique, such techniques are readily distinguishable from the present invention. The sensor of the present invention is excited by an ac current to produce an ac magnetic intensity (H) in a substantially nonlinear magnetic material. The presence of an external magnetic field produces a second-order nonlinearity, which causes a signal voltage to be induced in a pickup winding. The sensor according to the present invention will respond to externally-produced magnetic fields, and not merely to time-rate-of-change of magnetic flux. It will, in general, not respond to externally applied unmagnetized magnetic materials, nor will it respond to conducting materials placed in its vicinity.

SUMMARY OF THE INVENTION

The apparatus according to the present invention typically comprises a sensor means which is secured to a fluid metering device of the type in which motion of an internal permanent magnet is related to fluid flow through the fluid metering device. It will be understood that the term "fluid", as used throughout this application, comprehends both liquids and gases, and indeed may comprehend powder or granular materials which, in some flow conditions, may exhibit the properties of a fluid.

The sensor means typically includes a core of a magnetic material, having one or more windings. An ac excitation current is provided to an excitation winding, which applies an ac magnetic intensity (H) to the magnetic material. An output winding, arranged for first-order cancellation of signals produced by the ac excitation current, serves to produce a first electrical signal that is related to the position of the internal permanent magnet of the fluid metering device.

Basically, the sensor is affected by the magnetic field of the internal permanent magnet of the fluid metering device by virtue of nonlinearities in the characteristics of magnetic induction (B) versus magnetic intensity (H) in the magnetic material. The external magnetic field of the permanent magnet within the fluid metering device serves to unbalance the magnetic coupling between the excitation coil and the pickup coil of the sensor means, and thereby produce the first electrical signal which is, of course, related to position of the permanent magnet. Since the internal permanent magnet rotates, or nutates, with fluid flow through the fluid metering device, the first electrical signal is, in some sense, representative of such flow.

The apparatus according to the present invention also includes a detection means, electrically connected to the sensor means. The detection means receives the first electrical signal and, by electronic signal processing which may include amplification or rectification, produces a second electrical signal which is related to fluid flow through the fluid metering device. Typically, the detection means includes an electronic rectifier, which may be a phase-sensitive rectifier.

It will be recognized that the second electrical signal, produced by the detection means, provides a pulse, or a voltage transition, each time a pole of the internal permanent magnet traverses or passes by the sensor means. These pulses, or voltage transitions, can thus be accumulated by means of a conventional electronic counter to provide an indication of fluid flow through the fluid metering device.

The apparatus according to the present invention may also include an amplifier, electrically connected intermediate the sensor means and the electronic rectifier. Such an amplifier serves to increase the amplitude, or voltage level, of the first electrical signal produced by the sensor means for more efficient rectification.

In addition, it is possible to introduce ac coupling at the output of the detection means in order to make the apparatus substantially immune to the effects of the earth's magnetic field. Alternatively, a dc magnetic intensity can be applied to the sensor means to offset, or cancel, the earth's magnetic field at the sensor means. This dc magnetic intensity may be produced, for example, by an additional coil (not shown in FIGS. 7 and 8) which is supplied an adjustable dc current.

BRIEF DESCRIPTION OF THE DRAWINGS

A complete understanding of the present invention can be obtained from the detailed description which follows, together with the accompanying drawings, wherein:

FIG. 7 illustrates the sense, or polarity, of the several electrical windings.

DESCRIPTION OF THE INVENTION

Figure 1:
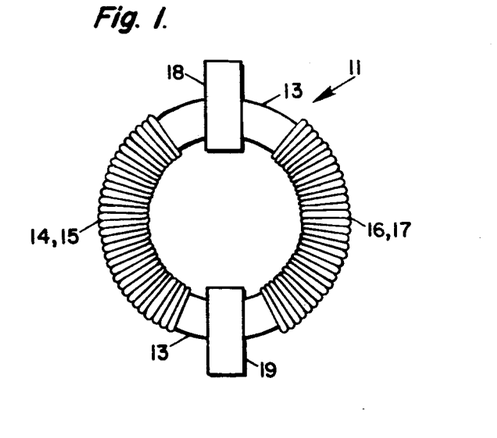
FIG. 1 is a plan view of a completed sensor means according to the present invention.
Figure 2:
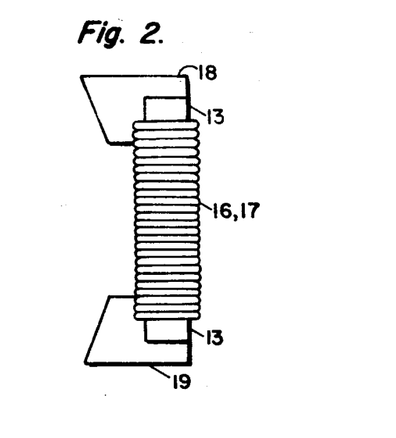
FIG. 2 is a side view of the sensor means in FIG. 1.
Figure 10:
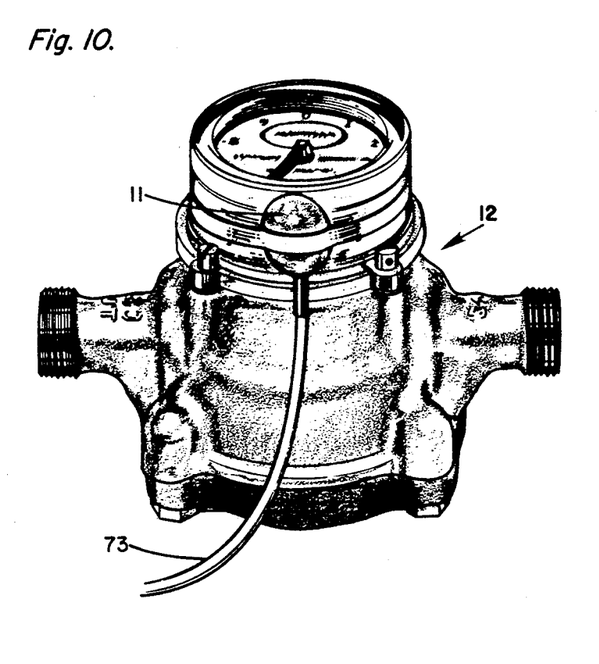
FIG. 10 is a view showing a typical arrangement in which the sensor means is secured to a fluid metering device.

The invention can best be understood by reference to the illustrative embodiment of FIGS. 1 and 2, which are, respectively, a plan view and a side view of a sensor means 11 according to the present invention. In actual operation, sensor means 11 is secured to an external surface of a fluid metering device, such as a water meter, of the type in which motion of an internal permanent magnet is related to fluid flow through the fluid metering device. FIG. 10 shows, in a general way, a typical installation of sensor 11 onto a fluid metering device 12. FIG. 10 will be discussed in greater detail, infra.

Shown in FIGS. 1 and 2 are a toroidal core 13 of magnetic material, onto which is wound one or more electrical windings, generally designated 14, 15, 16, and 17. Electrical windings 14, 15, 16, and 17 will be described in greater detail in connection with FIG. 7.

Figure 3:
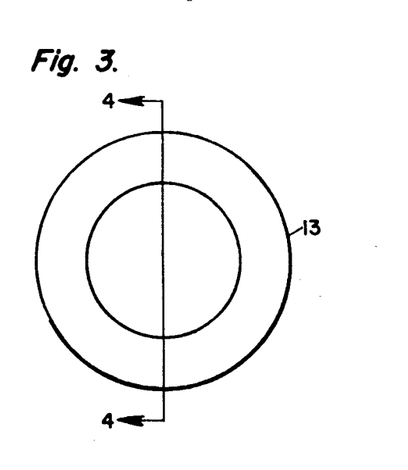
FIG. 3 is a plan view of a toroidal core of magnetic material which is a component of the completed sensor means of FIGS. 1 and 2.
Figure 4:
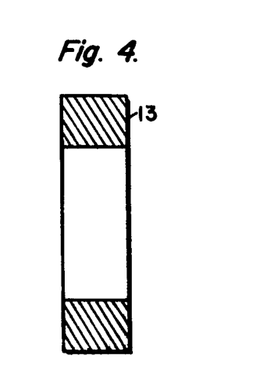
FIG. 4 is a cross-sectional view of the toroidal core of magnetic material shown in FIG. 3.

First coupler 18, and second coupler 19, can also be seen in FIGS. 1 and 2. Couplers 18 and 19 serve to provide a relatively low-reluctance path for coupling the external magnetic field of the permanent magnet internal to the fluid metering device to toroidal core 13 of magnetic material. FIGS. 3 and 4 show, respectively, a plan view and a cross-sectional view of toroidal core 13 of magnetic material.

The criteria for selecting a suitable material for toroidal core 13 of magnetic material are primarily high permeability and a relatively "square" hysteresis loop. These criteria are, to some extent, redundant. Suitable magnetic materials for toroidal core 13 include such alloys as Hi-Mu 80 Permalloy, Supermalloy, Deltamax, or Silectric. It is also possible to utilize a high-permeability ferrite material for toroidal core 13.

Figure 5:
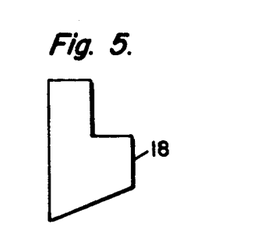
FIG. 5 is a view of the coupler utilized in the sensor means of FIGS. 1 and 2.
Figure 6:
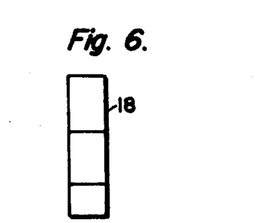
FIG. 6 is another view of the coupler of FIG. 5.

FIGS. 5 and 6 show a typical coupler 18 in plan view, and side view, respectively. It will be recognized that coupler 18 and coupler 19, in FIGS. 1 and 2, are mechanically identical. First coupler 18 and second coupler 19 may conveniently be constructed of any suitable magnetic material. In a preferred embodiment of the invention, first coupler 18 and second coupler 19 are fabricated from a ferrite material. As was explained in connection with FIGS. 1 and 2, first coupler 18 and second coupler 19 serve merely to couple the external magnetic field of the permanent magnet internal to the sealed fluid metering device, into toroidal core 13 of magnetic material. First coupler 18 and second coupler 19 may be secured to toroidal core 13 of magnetic material by, for example, cementing using a suitable epoxy adhesive. The exact technique for securing first coupler 18 and second coupler 19 to toroidal core 13 of magnetic material is not critical; however, it is desirable that the components be brought into relatively intimate mechanical contact to minimize the magnetic reluctance of the path presented to the external field of the permanent magnet internal to the fluid metering device. Of course, since much of the magnetic circuit is through air and other nonmagnetic materials, the intimacy of fit between first coupler 18 and toroidal core 13 of magnetic material, and second coupler 19 and toroidal core 13 of magnetic material, is not extremely critical.

Figure 7:
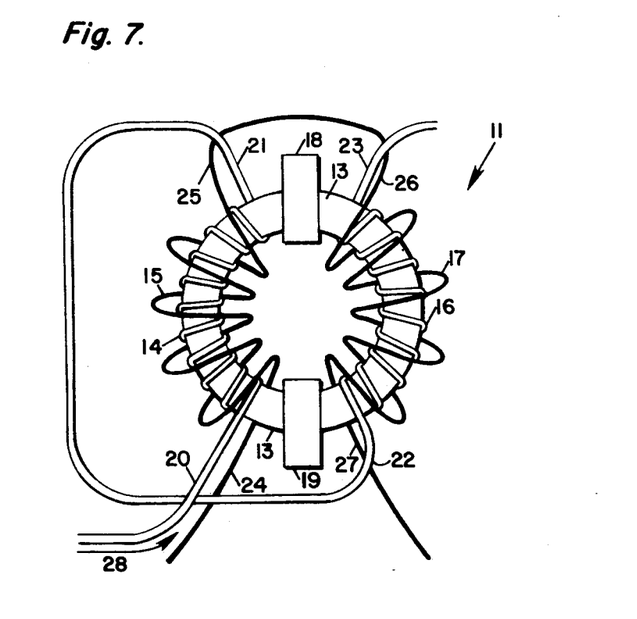
FIG. 7 is a mechanical schematic showing a plan view of a completed sensor means.
Figure 8:
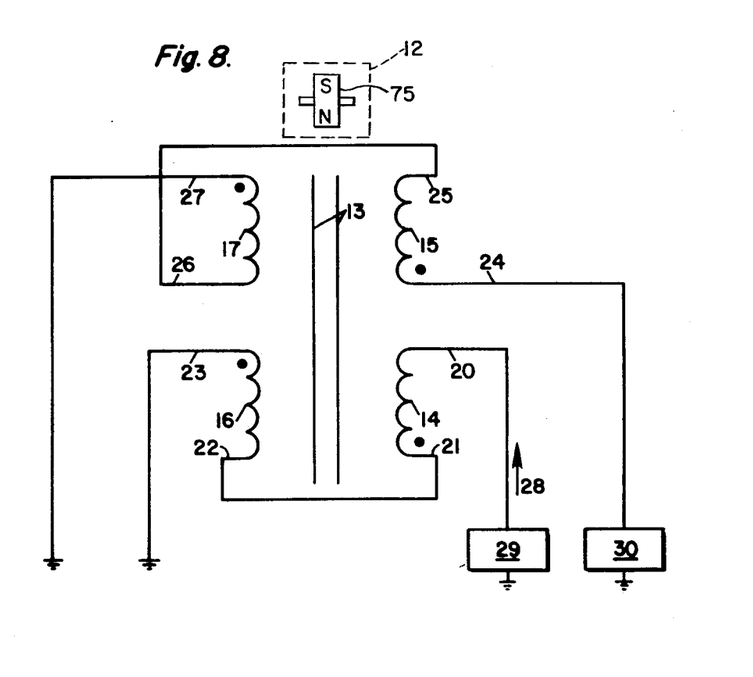
FIG. 8 is an electrical schematic view of the sensor means of FIG. 7, showing the several windings, with indications (dots) showing the sense, or polarity, of the several windings.

FIG. 7 shows, in mechanical schematic form, the arrangement of the various windings of the illustrative embodiment of the sensor means 11. FIG. 8 supplements FIG. 7, in that it (FIG. 8) shows, in electrical schematic form, the arrangement of the various windings. It is to be understood that the arrangement of FIGS. 7 and 8 is for purposes of illustration only, and various other arrangements can be utilized.

Referring now to FIG. 7, there is shown first excitation winding 14, series-connected with second excitation winding 16. As can be seen from FIGS. 7 and 8, the series connection of first excitation winding 14 and second excitation winding 16 is such that an ac excitation current 28 supplied to the series-connected windings 14 and 16 will tend to produce a circular magnetic intensity (H) within toroidal core 13 of magnetic material. In simple terms, first excitation winding 14 and second excitation winding 16 are connected such that the magnetic effect of an electrical current supplied to the series-connection of these windings is additive in toroidal core 13 of magnetic material.

To aid in relating the mechanical schematic of FIG. 7 to the electrical schematic of FIG. 8, there are designated first end 20 of first excitation winding 14; second end 21 of first excitation winding 14, which is connected to first end 22 of second excitation winding 16; and, finally, second end 23 of second excitation winding 16. As can be seen from FIG. 8, second end 23 of second excitation winding 13 may be connected to electrical ground, while first end 20 of first electrical winding 14 is supplied with the ac excitation current 28 from excitation means 29.

First excitation winding 14 and second excitation winding 16 can thus be regarded generally as "excitation winding means", the purpose of which is to receive the ac excitation current 28, produced by excitation means 29, and for applying an ac magnetic intensity (H) to toroidal core 13 of magnetic material. It will be understood by those skilled in the art that the dimensions of this magnetic intensity (H) commonly-used are ampere-turns/meter, or Oersteds.

Also shown in FIGS. 7 and 8 are first pickup winding 15 having a first end 24 and a second end 25, series-connected with second pickup winding 17, having a first end 26 and a second end 27. First pickup winding 15 and second pickup winding 17 are series-connected, although (as is apparent from FIGS. 7 and 8) the connection is series-opposition, as distinguished from the series-addition connection of first excitation winding 14 and second excitation winding 16. First pickup winding 15 and second pickup winding 17, taken together, may be considered "pickup winding means," having the purpose of producing an electrical signal related to magnetic induction (B) in the magnetic material of toroidal core 13. It will be understood by those skilled in the art that the commonly-used dimensions of this magnetic induction are Teslas (Webers/meter$^2$), or Gauss.

The series-opposition connection of first pickup winding 15 and second pickup winding 17 is such that, in the absence of any magnetic field applied via couplers 18 and 19, the voltages induced in first pickup winding 15 and second pickup winding 17 (as a consequence of the ac excitation current 28 applied to first excitation winding 14 and second excitation winding 16) are equal and opposite. Therefore, to a reasonable approximation, there is no net ac voltage induced in the series-connection of first pickup winding 15 and second pickup winding 17 in the absence of an external magnetic field applied via first coupler 18 and second coupler 19.

If, however, an external magnetic field is applied to sensor means 11 via first coupler 18 and second coupler 19, as will occur when the internal permanent magnet 75 of a sealed fluid metering device passes the vicinity of sensor means 11, there will be induced in both first pickup winding 15 and second pickup winding 17 additional ac voltages that include even harmonics of the ac excitation current 28. These even harmonics will be additive in the series-connection of first pickup winding 15 and second pickup winding 17, such that there will appear, across the series-connection of first pickup winding 15 and second pickup winding 17, a net ac voltage (the "first electrical signal") substantially composed of even harmonics of the ac excitation current 28.

FIG. 8 shows detection means 30, electrically connected to the series-connected pickup windings 15 and 17. Detection means 30 serves to receive and process the first electrical signal produced by sensor means 11, and to produce a second electrical signal which is related to fluid flow through fluid metering device 12. The pickup winding means, comprising first pickup winding 15 and second pickup winding 17, produces the first electrical signal that is related to position of the permanent magnet internal to fluid metering device 12. Both excitation means 29 and detection means 30 will now be described in greater detail.

Figure 9:
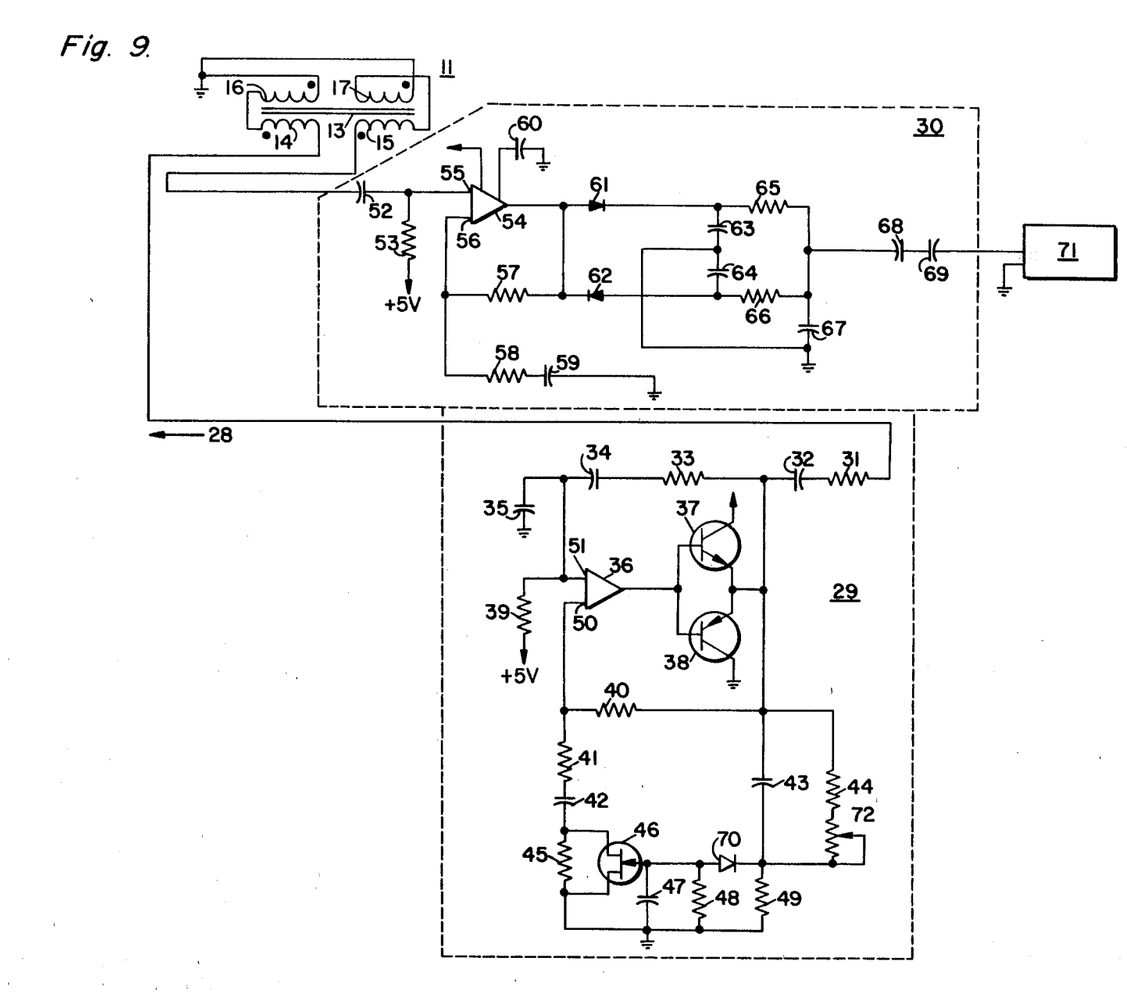
FIG. 9 is an electrical schematic diagram showing the sensor means, a typical circuit for the excitation means, and a typical circuit for the detection means.

Referring now to FIG. 9, there can be seen sensor means 11, comprising toroidal core 13 of magnetic material, first and second excitation winding means 14 and 16, respectively, and first and second pickup winding means 15 and 17 respectively.

It can be seen, in FIG. 9, that the excitation winding means, comprising the series connection of first excitation winding 14 and second excitation winding 16, is supplied an ac excitation current 28 by the excitation means denoted generally 29 in FIG. 9. The first electrical signal, produced by the pickup winding means comprising first pickup winding 15 and second pickup winding 17, is applied to the detection means denoted generally 30 in FIG. 9.

FIG. 9 also shows utilization means 71, electrically connected to the output of detection means 30.

By way of illustration only, the types and values of the various components shown in FIG. 9 are listed in the following table:

| Component Designation | Description |
| --- | --- |
| 31 | Resistor, 100 ohm |
| 32 | Capacitor, electrolytic, 100 uF |
| 33 | Resistor, 300 k |
| 34 | Capacitor, 1.3 nF |
| 35 | Capacitor, 39 nF |
| 36 | Operational amplifier, one-half LM10 |
| 37 | Transistor, bipolar NPN, 2N2222A |
| 38 | Transistor, bipolar PNP, 2N2907A |
| 39 | Resistor, 10 k |
| 40 | Resistor, 100 k |
| 41 | Resistor, 1 k |
| 42 | Capacitor, electrolytic, 1 uF |
| 43 | Capacitor, electrolytic, 10 uF |
| 44 | Resistor, select-by-test |
| 45 | Resistor, 10 k |
| 46 | Transistor, N-channel FET, 2N3822 |
| 47 | Capacitor, electrolytic, 1 uF |
| 48 | Resistor, 1 M |
| 49 | Resistor, 100 k |
| 52 | Capacitor, electrolytic, 1 uF |
| 53 | Resistor, 100 k |
| 54 | Operational amplifier, LM308 |
| 57 | Resistor, 100 k |
| 58 | Resistor, 453 ohm |
| 59 | Capacitor, electrolytic, 10 uF |
| 60 | Capacitor, 100 pF |
| 61 | Silicon diode, 1N4454 |
| 62 | Silicon diode, 1N4454 |
| 63 | Capacitor, 100 nF |
| 64 | Capacitor, 100 nF |
| 65 | Resistor, 100 k |
| 66 | Resistor, 100 k |
| 67 | Capacitor, 100 nF |
| 68 | Capacitor, electrolytic, 33 uF |
| 69 | Capacitor, electrolytic, 33 uF |
| 70 | Silicon diode, 1N4454 |
| 72 | Resistor, variable, 100 k |

Excitation means 29 generally comprises operational amplifier 36, having an inverting input 50 and a non-inverting input 51, together with the various ancillary components shown in FIG. 9. In particular, NPN bipolar transistor 37 and PNP bipolar transistor 38 are provided to supply a greater excitation current than would be available from operational amplifier 36 alone. Field-effect transistor 46 serves as an automatic gain control (AGC) device to maintain a constant ac voltage amplitude at the junction of the emitters of NPN bipolar transistor 37 and PNP bipolar transistor 38. The ac voltage appearing at this node is coupled, via capacitor 32 and resistor 31, to provide ac excitation current 28 to the excitation winding means comprising the series connection of first excitation winding 14 and second excitation winding 16 of sensor means 11. Variable resistor 72 serves to adjust the amplitude of the ac voltage produced by excitation means 29.

Also shown in FIG. 9 is a typical detection means 30, comprising generally operational amplifier 54, having an inverting input 56, and a non-inverting input 55. It can be seen, in FIG. 9, that the output signal developed across the pickup winding means, comprising generally first pickup winding 15 and second pickup winding 17, is applied, via capacitor 52, to the non-inverting input 55 of operational amplifier 54. Operational amplifier 54 serves to amplify the first electrical signal produced by sensor means 11 in response to position, or motion, of the permanent magnet internal to fluid metering device 12. Negative feedback is provided from the output of operational amplifier 54, via resistors 57 and 58, and capacitor 59, to the inverting input 56 of operational amplifier 54. The amplified electrical signal appearing at the output of operational amplifier 54 is rectified by semiconductor diodes 61 and 62 to produce a dc, or slowly-varying, voltage across the series connection of capacitors 63 and 64.

It will be recognized that positive-going excursions of the voltage signal appearing at the output of operational amplifier 54 are rectified by semiconductor diode 61 to produce a positive voltage across capacitor 63. Similarly, negative-going excursions of the voltage signal appearing at the output of operational amplifier 54 are rectified by semiconductor diode 62 to produce a negative voltage across capacitor 64. The positive voltage, appearing on capacitor 63, and the negative voltage, appearing on capacitor 64 are summed by resistor 65 and resistor 66, to produce, across capacitor 67, a voltage that is approximately the mean of the two voltages appearing across capacitors 63 and 64. Resistors 65 and 66 thus serve as "summing means", for combining the voltages appearing across capacitors 63 and 64. When the voltage waveform appearing at the output of operational amplifier 54 has substantially equal positive and negative excursions (about an average, or mean, voltage), the incremental voltages developed across capacitors 63 and 64 (as a result of rectification of the voltage waveform applied to diodes 61 and 62) are approximately equal and opposite, resulting in a relatively small incremental voltage across capacitor 67. However, when one or the other poles of the permanent magnet internal to fluid metering device 12 approaches sensor means 11, so as to couple magnetic flux into toroidal core 13 of magnetic material via first coupler 18 and second coupler 19, there will be developed across the pickup winding means (comprising first pickup winding 15 and second pickup winding 17) an asymmetrical voltage waveform. The sense of the asymmetry will be different, depending on whether a north (N) or south (S) magnetic pole approaches sensor means 11. This asymmetrical voltage waveform will tend to produce a greater positive voltage on capacitor 63, or a lesser positive voltage on capacitor 64, depending on the polarity of the magnetic pole in proximity to sensor means 11.

If the permanent magnet internal to fluid metering device 12 now rotates, or nutates, in response to fluid flow through fluid metering device 12, opposite magnetic poles will sequentially be coupled through first coupler 18 and second coupler 19 (FIG. 7) into toroidal core 13 of magnetic material. There will thus appear, across capacitor 67 (FIG. 9) a voltage waveform having the same period as the period of rotation or nutation of the permanent magnet internal to fluid metering device 12.

It will then be obvious, to one skilled in the art, that this voltage waveform, appearing across capacitor 67 in FIG. 9, can be filtered and applied to a level detector, and the pulses or transitions produced by such level detector counted to provide an indication of fluid flow through fluid metering device 12. The circuitry utilized for filtering, thresholding, and counting such pulses or transitions is entirely conventional, and is represented generally by utilization means 71 in FIG. 9. Similar circuitry is described in U.S. Pat. Nos. 3,780,579 and 3,783,248.

It is important to note that sensor means 11, and associated detection means 30, at least through capacitor 67, is "dc responding", in that a static (dc) magnetic field applied to sensor means 11 will result in a static, dc voltage appearing on capacitor 67. Because the apparatus according to the present invention can be very sensitive, it is possible that the earth's magnetic field may, in some situations, cause a substantial dc voltage to appear across capacitor 67. Such a dc voltage may interfere with proper operation of the apparatus, and hence capacitors 68 and 69 may be provided to introduce a stage of ac coupling between detection means 30 and utilization means 71. Capacitors 68 and 69 basically permit the apparatus to reject the effects of static (dc) magnetic fields, such as the earth's magnetic field, while allowing signals associated with rotation of the permanent magnet internal to fluid metering device 12 to be given appropriate effect. In many applications, it may be sufficient to use only a single capacitor 68. However, where it is necessary to couple very low frequencies utilizing polar electrolytic capacitors, the back-to-back series connection of two such capacitors, 68 and 69, is advantageous.

Although the arrangement of detection means 30 shown in FIG. 9 utilizes semiconductor diodes 61 and 62 in a rectifier arrangement, it will be recognized that in some applications a phase-sensitive rectifier may provide additional benefits, such as rejection of extraneous signals. In such a phase-sensitive rectifier, detection is accomplished by effectively multiplying the signal, such as the signal produced at the output of operational amplifier 54, by a signal that is related to ac excitation current 28, or to an even harmonic of ac excitation current 28.

Finally, FIG. 10 shows the installation of a typical sensor means 11 on a fluid metering device 12. In this arrangement, a semi-soft adhesive, similar to modeling clay, is utilized to secure sensor means 11 to fluid metering device 12. FIG. 10 is included by way of illustration only, and it will be understood by those skilled in the art that any of a variety of fastening techniques may be utilized to secure sensor means 11 to fluid metering device 12. In particular, it is possible to secure sensor means 11 using a strap, or electrical tape. A material such as Velcro can be affixed to sensor means 11 and to fluid metering device 12 to facilitate securing and releasing sensor means 11 from fluid metering device 12. Lead 73 serves to carry the electrical connections between sensor means 11, on the one hand, and excitation means 29 and detection means 30, on the other.

It will be understood by those skilled in the art that many modifications and variations of the present invention may be made without departing from the spirit and scope thereof.

Having thus described my invention, I claim as follows:

1. An apparatus for providing an indication of fluid flow through a fluid metering device of the type in which the motion of an internal permanent magnet in a housing is related to fluid flow through the fluid metering device, said apparatus comprising:
   (a) excitation means for providing an AC excitation current, said excitation means including an operational amplifier having an inverting input and a non-inverting input and an output, an NPN bipolar transistor and a PNP bipolar transistor having their bases connected together to the output of said operational amplifier and their emitters connected together so as to provide a greater excitation current, automatic gain control means for providing constant AC voltage amplitude to the junction of the emitters of said bipolar transistors, a feed back means from said bipolar transistors to said inverting input of said operational amplifier, and a source of DC current connected to said non-inverting input of said operational amplifier;
   (b) a core of magnetic material having a substantially non-linear characteristic;
   (c) at least two excitation windings connected to said excitation means and wound in series on said core such that their magnetic effect is additive and wherein the output of said bipolar transistor emitters is coupled to said excitation windings;
   (d) at least two pick-up windings connected to each other in series and wound in such a fashion that they are in magnetic opposition to each other; and,
   (e) detection means, electrically connected to said pick-up windings for producing an output signal proportional to the flow of fluid through the fluid metering device,
   wherein said magnetic core, said excitation windings and said pick-up windings comprise a sensor which is mountable external of the housing for the internal permanent magnet.

2. An apparatus for providing an indication of fluid flow through a fluid metering device of the type in which the motion of an internal permanent magnet in a housing is related to fluid flow through the fluid metering device, said apparatus comprising:
   (a) excitation means for providing an AC current, said excitation means including an operational amplifier having an inverting input and a non-inverting input and an output, an NPN bipolar transistor and a PNP bipolar transistor having their bases connected together to the output of said operational amplifier and their emitters connected together so as to provide a greater output excitation current, automatic gain control means for providing constant AC voltage amplitude to the junction of the emitters of said bipolar transistors, a feedback means from said bipolar transistors to said inverting input of said operational amplifier, and a source of DC current connected to said non-inverting input of said operational amplifier;
   (b) a core of magnetic material having a substantially non-linear characteristic;
   (c) at least two excitation windings connected to said excitation means and wound in series on said core such that their magnetic effect is additive, and wherein the output of said bi-polar transistor emitters is coupled to said excitation windings;

(d) at least two pick-up windings connected to each other in series and wound in such a fashion that they are in magnetic opposition to each other; and, (e) detection means, electrically connected to said pick-up windings for producing an output signal proportional to the flow of fluid through the fluid metering device, said detection means including a pair of semi-conductor diodes connected to said pick-up windings, a pair of series connected capacitors connected to said semi-conductor diodes; summing means for combining voltages appearing across said capacitors, means for storing the output of said summing means, and a negative feed back amplifier means connected between said pick-up windings and said semi-conductor diodes for amplifying the output from said pick-up windings, wherein said magnetic core, said excitation windings and said pick-up windings comprise a sensor which is mountable external of the housing for the internal permanent magnet.

3. The apparatus of claim 2 wherein said automatic gain control means includes a variable resistor to adjust the amplitude of the AC voltage produced by said excitation means.

4. The apparatus of claim 3 further including:
coupling means attached to said core to assist in the detection of said permanent magnet through said housing.

* * * * *